(12) United States Patent
Yin et al.

(10) Patent No.: US 8,472,157 B2
(45) Date of Patent: Jun. 25, 2013

(54) OVERVOLTAGE AND OVERCURRENT PROTECTION CIRCUIT

(75) Inventors: Ji-Xiang Yin, Shenzhen (CN); Yang Xin, Shenzhen (CN); Yin-Zhan Wang, Shenzhen (CN); Jun Zhang, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 74 days.

(21) Appl. No.: 13/207,431

(22) Filed: Aug. 11, 2011

(65) Prior Publication Data

US 2013/0021701 A1 Jan. 24, 2013

(30) Foreign Application Priority Data

Jul. 22, 2011 (CN) .......................... 2011 1 0207257

(51) Int. Cl.
| | |
|---|---|
| *H02H 3/00* | (2006.01) |
| *H02H 3/20* | (2006.01) |
| *H02H 9/04* | (2006.01) |
| *H02H 3/08* | (2006.01) |
| *H02H 9/02* | (2006.01) |

(52) U.S. Cl.
USPC ............................ 361/79; 361/91.1; 361/93.1

(58) Field of Classification Search
USPC .......................................... 361/91.1, 93.1, 79
See application file for complete search history.

(56) References Cited

U.S. PATENT DOCUMENTS 6,992,463 B2 * 1/2006 Yoshio .......................... 320/134

* cited by examiner

*Primary Examiner* — Dharti Patel
(74) *Attorney, Agent, or Firm* — Altis Law Group, Inc.

(57) ABSTRACT

An overvoltage and overcurrent protection circuit includes a connection jack, an overvoltage protection switch connected to the connection jack, an overcurrent protection switch, a voltage reference module, an overvoltage and overcurrent detection module, a comparing module, and a current control module. The overcurrent protection switch is connected to the overvoltage protection switch in serials, and further connected to a load. The voltage reference module is to output a reference voltage. The overvoltage and overcurrent detection module is to detect the voltage of the load and the current of the path. The comparing module is to compare the voltage of the load with the reference voltage, when greater, turns off the overvoltage protection switch, when not greater, turns on the overvoltage protection switch. The current control module is to turn off the overcurrent protection switch if greater than the preset value, and turn on the overcurrent protection switch if not greater.

18 Claims, 2 Drawing Sheets

OVERVOLTAGE AND OVERCURRENT PROTECTION CIRCUIT

BACKGROUND

1. Technical Field

The present disclosure relates to circuits and, particularly, to an overvoltage and overcurrent protection circuit.

2. Description of Related Art

When powering on an electronic device, the voltage of a circuit of the electronic device may be raised above its rated voltage, that is, an overvoltage condition may occur. Moreover, when the circuit is short-circuited or overloaded, the current drawn by the circuit may be more than what is rated for, that is, an overcurrent condition occurs. Overvoltage and overcurrent may damage electronic elements of the device. Therefore, an overvoltage and overcurrent protection circuit is needed to solve the above problems.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure are now described in detail, with reference to the accompanying drawings.

Figure 1:
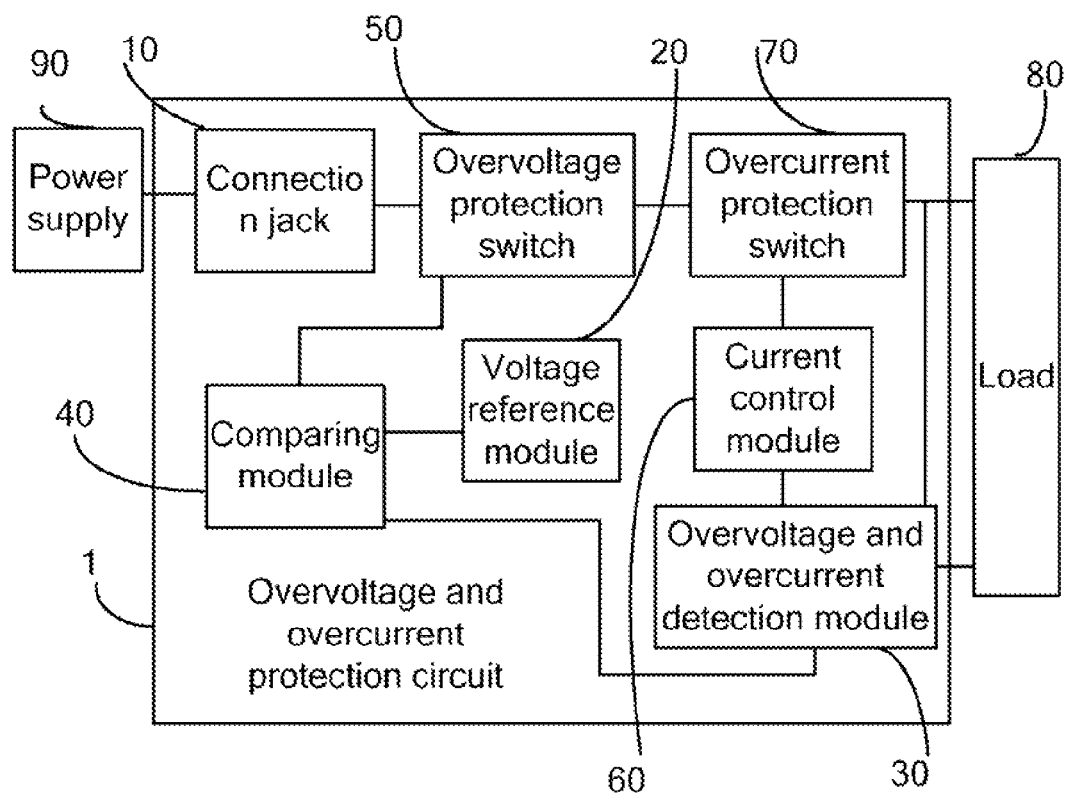
FIG. 1 is a block diagram of an overvoltage and overcurrent protection circuit in accordance with an exemplary embodiment.

Referring to FIG. 1, a block diagram of an overvoltage protection circuit 1 in accordance with an exemplary embodiment is shown. The circuit 1 includes a connection jack 10, a voltage reference module 20, an overvoltage and overcurrent detection module 30, a comparing module 40, an overvoltage protection switch 50, a current control module 60, an overcurrent protection switch 70, and a load 80. The connection jack 10 is connected to a power supply 90 to receive power from the power supply 90. The overvoltage protection switch 50 and the overcurrent protection switch 70 are connected between the connection jack 10 and the load 80, and are configured for controlling a connection between the connection jack 10 and the load 80. When the overvoltage protection switch 50 and the overcurrent protection switch 70 are both turned on, the connection between the connection jack 10 and the load 80 is enabled; when either the overvoltage protection switch 50 or the overvoltage protection switch 70 is turned off, the connection between the connection jack 10 and the load 80 is disabled.

The voltage reference module 20 is connected to the comparing module 40 to provide a stable reference voltage to the comparing module 40. The detection module 30 is to detect the voltage to the load 80 and current drawn by the load 80 in real time. The detection module 30 is connected to both the comparing module 40 and the current control module 60 to output voltage to the comparing module 40 equal to that supplied to the load 80 and conduct current drawn by the load 80 to the current control module 60.

The comparing module 40 is to compare the voltage to the load 80 with the reference voltage provided by the voltage reference module 20. If the comparing module 40 determines that the voltage to the load 80 is greater than the reference voltage, namely, an overvoltage condition occurs, the comparing module 40 turns off the overvoltage protection switch 50, thus the connection between the connection jack 10 and the load 80 is disabled, and the connection between the power supply 90 and the load 80 is also disabled. That is, when an overvoltage condition occurs, power to the load 80 from the power supply 90 is cut off, and the load 80 is protected. If the comparing module 40 determines that the voltage to the load 80 is not greater than the reference voltage, namely, no overvoltage condition exists, the comparing module 40 turns on the overvoltage protection switch 50.

Furthermore, if the current drawn by the load 80 is greater than a preset value, namely, an overcurrent condition occurs, the current control module 60 turns off the overcurrent protection switch 70, thus the connection between the connection jack 10 and the load 80 is disabled, and the connection between the power supply 90 and the load 80 is also disabled. That is, when an overcurrent condition occurs, power to the load 80 from the power supply 90 is cut off, and the load 80 is protected. Whenever the current drawn by the load 80 is not greater than the preset value, namely, no overcurrent condition exists, the current control module 60 turns on the overcurrent protection switch 70. When the overvoltage protection switch 50 and the overcurrent protection switch 70 are both turned on, the connection between the connection jack 10 and the load 80 is enabled, and the connection between the power supply 90 and the load 80 is also enabled. That is, when no overvoltage or overcurrent condition exists, the load 80 can receive power from the power supply 90.

Figure 2:
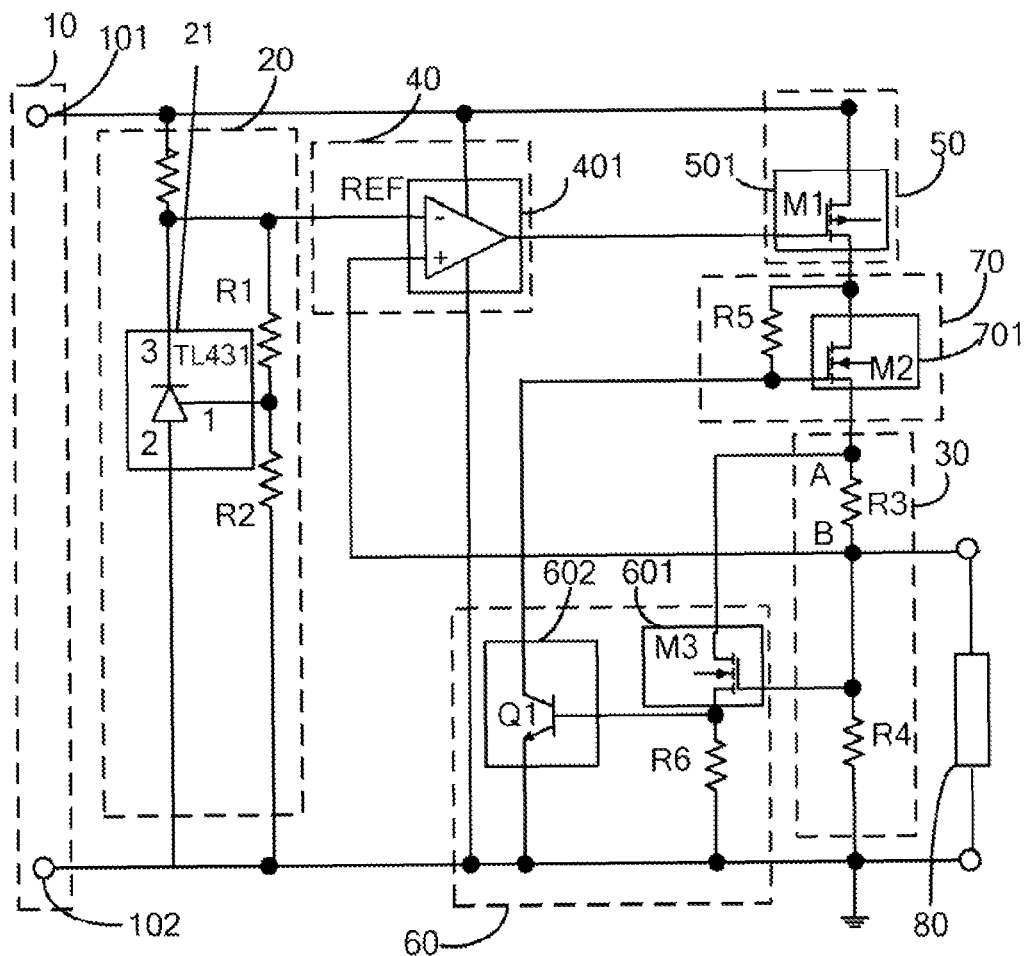
FIG. 2 is a circuit diagram of FIG. 1, in accordance with an exemplary embodiment.

Referring to FIG. 2, a circuit diagram of the circuit 1 is shown. The connection jack 10 includes an anode input port 101 and a cathode input port 102 respectively connected to an anode and a cathode of the power supply 90.

The voltage reference module 20 includes a shunt regulator 21, a resistor R1, and a resistor R2. In the embodiment, the shunt regulator 21 is a 2.5V TL431 shunt regulator. A reference terminal of the TL431 shunt regulator 21 is connected to both the comparing module 40 and the anode input port 101 of the connection jack 10 through the resistor R1, and is further grounded through the resistor R2. An anode terminal of the TL431 shunt regulator 21 is grounded. A cathode terminal of the TL431 shunt regulator 21 is connected to the anode input port 101 of the connection jack 10 through a resistor. In this embodiment, the resistance of the resistor R1 is R1, the resistance of the resistor R2 is R2, and an end of the resistor R1 far away from the reference terminal to the TL431 shunt regulator 21 is connected to REF terminal, the voltage to the reference terminal V=2.5 v, thus the voltage to the REF terminal is $V_{REF}=V \times (R1+R2)/R2$, namely, the $V_{REF}=2.5 \times (R1+R2)/R2$.

The detection module 30 is connected between the ground and the overcurrent protection switch 70. The detection module 30 includes a resistor R3 and a resistor R4. The resistor R3 and the resistor R4 are connected in series between the overcurrent protection switch 70 and the ground. The resistor R4 and the load 80 are connected in parallel and are grounded. The voltage to the load 80 detected by the detection module 30 is the voltage across the resistor R4. In this embodiment, the resistance of the resistor R4 is far greater than that of the load 80, thus the current of the path including the load 80 detected by the detection module 30 is the current through the resistor R3. A node A is formed among the resistor R3, the overcurrent protection switch 70, and the current control module 60, and a node B is formed among the resistor R3, the resistor R4, and the load 80, thus the voltage across the load 80 is the voltage at the node B.

The comparing module 40 includes an analog comparator 401. A non-inverting input terminal of the analog comparator 401 is connected to the node B, an inverting input terminal of the analog comparator 401 is connected to the REF terminal, and an output terminal of the analog comparator 401 is connected to the overvoltage protection switch 50.

The overvoltage protection switch 50 includes a low voltage activated switch 501. In the embodiment, the low voltage activated switch 501 is a p-channel metal-oxide-semiconductor field-effect transistor (PMOSFET) M1. A source of the PMOSFET M1 is connected to the anode input port 101 of the connection jack 10, a drain of the PMOSFET M1 is connected the overcurrent protection switch 70, and a gate of the PMOSFET M1 is connected to the output terminal of the analog comparator 401.

The overcurrent protection switch 70 includes a resistor R5 and a high voltage activated switch 701. In the embodiment, the high voltage activated switch 701 is an n-channel metal-oxide-semiconductor field-effect transistor (NMOSFET) M2. The resistor R5 is arranged between a gate of the NMOSFET M2 and a drain of the NMOSFET M2. The gate of the NMOSFET M2 is connected to the current control module 60. The drain of the NMOSFET M2 is connected to the drain of the PMOSFET M1. A source of the NMOSFET M2 is connected to the node A.

The current control module 60 includes a first high voltage activated switch 601, a second high voltage activated switch 602, and a resistor R6. In the embodiment, the first high voltage activated switch 601 is an NMOSFET M3. The second high voltage activated switch 602 is an npn bipolar junction transistor (BJT) Q1. A gate of the NMOSFET M3 is connected to the node B, a drain of the NMOSFET M3 is connected to the node A, namely, the resistor R3 is connected between the gate of the NMOSFET M3 and the drain of the NMOSFET M3. A source of the NMOSFET M3 is connected to a base of the BJT Q1, and grounded through the resistor R6. An emitter of the BJT Q1 is grounded. A collector of the BJT Q1 is connected to the gate of the NMOSFET M2.

If the voltage to the load 80 detected by the overvoltage and overcurrent detection module 70 is greater than the reference voltage $V_{REF}$, namely, overvoltage condition occurs, and the analog comparator 401 outputs a high voltage to the gate of the PMOSFET M1 to turn off the PMOSFET M1, thus the connection between the power supply 90 and the load 80 is disabled, the voltage to the load 80 is zero, which prevents the load 80 from being damaged by the overvoltage.

If the current flowing through the resistor R3 is greater than a preset value, namely overcurrent condition occurs, the voltage across the resistor R3 is greater than a preset value, thus the converting voltage is greater than the preset value, resulting in the NMOSFET M3 turning on. The base of the BJT Q1 is connected to the node A to obtain a high voltage through the turned on NMOSFET M3, resulting in the BJT Q1 turning on. The gate of the NMOSFET M2 is grounded through the turned on BJT Q1, resulting in the NMOSFET M2 turning off, thus the connection between the power supply 90 and the load 80 is disabled, the current drawn by the load 80 is zero, which prevents the load 80 from being damaged by overcurrent.

When there is no more condition of overvoltage and overcurrent, the circuit 1 enters a stable state. The voltage to the load 80 is not greater than the reference voltage, and the analog comparator 401 outputs a low voltage to the gate of the PMOSFET M1 to turn on the PMOSFET M1. The current flowing through the resistor R3 is not greater than the preset value, thus the converting voltage is not greater than the preset value, resulting in the NMOSFET M3 turning off. The base of the BJT Q1 is grounded through the resistor R6, resulting in the BJT Q1 turning off. The gate of the NMOSFET M2 is connected to the anode input port 101 of the connection jack 10 through the resistor R5 and the turned on PMOSFET M1, resulting in the NMOSFET M2 turning on, and the connection between the power supply 90 and the load 80 is enabled, thus the power supply 90 provides power to the load 80.

With such configuration, when an overvoltage condition occurs, the comparing module 40 turns off the overvoltage protection switch 50 to cut off the connection between the connection jack 10 and the load 80, and when an overcurrent condition occurs, the current control module 60 turns off the overcurrent protection switch 70 to cut off the connection between the connection jack 10 and the load 80. Thus the load 80 cannot receive power from the power supply 90 and is protected from overvoltage and overcurrent.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An overvoltage and overcurrent protection circuit, comprising:
   a connection jack for connecting to a power supply to receive power from the power supply;
   an overvoltage protection switch connected to the connection jack;
   an overcurrent protection switch connected to the overvoltage protection switch in serials, and further configured to be connected to a load;
   a voltage reference module to output a reference voltage;
   an overvoltage and overcurrent detection module connected between the overcurrent protection switch and ground, and to detect the voltage of the load and the current of the path including the load in real time;
   a comparing module connected to the voltage reference module, the overvoltage and overcurrent detection module, and the overvoltage protection switch, and to compare the voltage of the load detected by the overvoltage and overcurrent detection module with the reference voltage output by the voltage reference module, the comparing module further to turn off the overvoltage protection switch when the voltage of the load is greater than the reference voltage, and turn on the overvoltage protection switch when the voltage of the load is not greater than the reference voltage; and
   a current control module connected to the overvoltage and overcurrent detection module and the overcurrent protection switch, to turn off the overcurrent protection switch when the current of the path is greater than a preset value, and turn on the overcurrent protection switch when the current of the path is not greater than the preset value.

2. The overvoltage and overcurrent protection circuit as described in claim 1, wherein the voltage reference module comprises a shunt regulator, a first resistor, and a second resistor, a reference terminal of the shunt regulator is connected to both the comparing module and an anode of the power supply through the first resistor, and is connected to ground through the second resistor, an anode terminal of the shunt regulator is grounded, and a cathode terminal of the shunt regulator is connected to the anode of the power supply, the voltage reference module is to output a reference voltage to the comparing module.

3. The overvoltage and overcurrent protection circuit as described in claim 1, wherein the overvoltage and overcurrent detection module comprises a first resistor and a second resistor, the first resistor and the second resistor are in series between the overcurrent protection switch and the ground, the second resistor is grounded and in parallel with the load, the current of the path including the load is the current flowing through the first resistor, the voltage of the load is the voltage of the second resistor, the overvoltage and overcurrent detection module outputs the voltage of the load and the current of the path to the comparing module and the current control module, respectively.

4. The overvoltage and overcurrent protection circuit as described in claim 3, wherein the resistance of the second resistor is far greater than that of the load.

5. The overvoltage and overcurrent protection circuit as described in claim 3, wherein when the overvoltage condition occurs, the voltage of the load detected by the overvoltage and overcurrent detection module is greater than the reference voltage; when no overvoltage condition exists, the voltage of the load is not greater than the reference voltage.

6. The overvoltage and overcurrent protection circuit as described in claim 3, wherein when overcurrent condition occurs, the current of the path is greater than the preset value; when no overcurrent condition exists, the current of the path is not greater than the preset value.

7. The overvoltage and overcurrent protection circuit as described in claim 3, wherein the comparing module comprises an analog comparator, a non-inverting input terminal of the analog comparator is connected to the overvoltage and overcurrent detection module, an inverting input terminal of the analog comparator is connected to the voltage reference module, and output terminal of the analog comparator is connected to the overvoltage protection switch.

8. The overvoltage and overcurrent protection circuit as described in claim 3, wherein the overvoltage protection switch includes a low voltage activated switch, the low voltage activated switch comprises a first terminal connected to an anode of the power supply, a second terminal connected to the overcurrent protection switch, and a third terminal connected to the comparing module.

9. The overvoltage and overcurrent protection circuit as described in claim 8, wherein the low voltage activated switch is a p-channel metal-oxide-semiconductor field-effect transistor (PMOSFET), the first, second, and third terminals are a source, a drain, and a gate of the PMOSFET, respectively.

10. The overvoltage and overcurrent protection circuit as described in claim 8, wherein when the comparing module outputs a high voltage to the overvoltage protection switch, the gate of the PMOSFET obtains a high voltage, resulting in the PMOSFET turning off.

11. The overvoltage and overcurrent protection circuit as described in claim 8, wherein when the comparing module outputs a low voltage to the overvoltage protection switch, the gate of the PMOSFET obtains a low voltage, resulting in the PMOSFET turning on.

12. The overvoltage and overcurrent protection circuit as described in claim 1, wherein the current control module comprises a first high voltage activated switch, a second high voltage activated switch, and a resistor, the first high voltage activated switch comprises a first terminal connected to the overvoltage and overcurrent detection module, a second terminal connected to the overcurrent protection switch and the overvoltage and overcurrent detection module, and a third terminal connected to the second high voltage activated switch and the ground through the resistor, the second high voltage activated switch comprises a first terminal connected to the first high voltage activated switch and the ground through the resistor, a second terminal connected to ground, and a third terminal connected to the overcurrent protection switch.

13. The overvoltage and overcurrent circuit as described in claim 12, wherein the first high voltage activated switch is an n-channel metal-oxide-semiconductor field-effect transistor (NMOSFET), the first, second, and third terminals are a gate, a drain, and a source of the NMOSFET, respectively, the second high voltage activated switch is an npn bipolar junction transistor (BJT), the first, second, and the third terminals are a base, an emitter, and a collector, respectively.

14. The overvoltage and overcurrent circuit as described in claim 13, wherein if the current of the path including the load is greater than the preset value, the NMOSFET is turned on, the base of the npn BJT is connected to the overcurrent protection switch and the overvoltage and overcurrent detection module through the turned on NMOSFET, resulting in the npn BJT turning on, the current control module outputs a low voltage to the overcurrent protection switch.

15. The overvoltage and overcurrent circuit as described in claim 13, wherein if the current of the path is not greater than the preset value, the NMOSFET is turned off, the base of the npn BJT is ground through the resistor, resulting in the npn BJT turning off.

16. The overvoltage and overcurrent circuit as described in claim 3, wherein the overcurrent protection switch comprises a resistor and a high voltage activated switch, the high voltage activated switch comprises a first terminal connected the current control module, a second terminal connected to the overvoltage protection switch, and a third terminal connected to the overvoltage and overcurrent detection module, the resistor is connected between the first terminal and the second terminal of the high voltage activated switch.

17. The overvoltage and overcurrent circuit as described in claim 16, wherein the high voltage activated switch is an n-channel metal-oxide-semiconductor field-effect transistor (NMOSFET), the first, second, and third terminals are a gate, a drain, and a source of the NMOSFET, respectively.

18. The overvoltage and overcurrent circuit as described in claim 17, wherein when the current control module outputs a low voltage to the overcurrent protection switch, the NMOSFET is turned off.

* * * * *